US010227435B2

(12) United States Patent
Chang et al.

(10) Patent No.: US 10,227,435 B2
(45) Date of Patent: Mar. 12, 2019

(54) POLYMERIZABLE POLYSILOXANES WITH HYDROPHILIC SUBSTITUENTS

(71) Applicant: Novartis AG, Basel (CH)

(72) Inventors: Frank Chang, Cumming, GA (US); Ryan DeSousa, Atlanta, GA (US); Jinyu Huang, Ridgewood, NJ (US)

(73) Assignee: Novartis AG, Basel (CH)

( * ) Notice: Subject to any disclaimer, the term of this patent is extended or adjusted under 35 U.S.C. 154(b) by 51 days.

(21) Appl. No.: 15/376,702

(22) Filed: Dec. 13, 2016

(65) Prior Publication Data
US 2017/0166674 A1 Jun. 15, 2017

Related U.S. Application Data

(60) Provisional application No. 62/267,312, filed on Dec. 15, 2015.

(51) Int. Cl.
C08L 101/14 (2006.01)
C08L 83/04 (2006.01)
C08F 290/06 (2006.01)
G02B 1/04 (2006.01)
C08G 77/20 (2006.01)
C08G 77/14 (2006.01)
C08G 77/38 (2006.01)
C08G 77/12 (2006.01)

(52) U.S. Cl.
CPC .......... C08F 290/068 (2013.01); C08G 77/14 (2013.01); C08G 77/20 (2013.01); C08G 77/38 (2013.01); G02B 1/043 (2013.01); C08G 77/12 (2013.01); C08G 2210/00 (2013.01)

(58) Field of Classification Search
None
See application file for complete search history.

(56) References Cited

U.S. PATENT DOCUMENTS

| 3,700,573 | A | * | 10/1972 | Laizier et al. | C08F 283/12 522/138 |
| 4,260,725 | A | * | 4/1981 | Keogh | C08F 230/08 264/1.1 |
| 4,444,711 | A | | 4/1984 | Schad | |
| 4,460,534 | A | | 7/1984 | Boehm et al. | |
| 5,034,461 | A | | 7/1991 | Lai et al. | |
| 5,321,108 | A | | 6/1994 | Kunzler et al. | |
| 5,346,946 | A | | 9/1994 | Yokoyama et al. | |
| 5,397,848 | A | * | 3/1995 | Yang | A61L 27/18 523/106 |
| 5,416,132 | A | | 5/1995 | Yokoyama et al. | |
| 5,449,729 | A | | 9/1995 | Lai | |
| 5,486,579 | A | | 1/1996 | Lai et al. | |
| 5,512,205 | A | | 4/1996 | Lai | |
| 5,760,100 | A | * | 6/1998 | Nicolson | G02C 7/049 351/159.33 |
| 5,843,346 | A | | 12/1998 | Morrill | |
| 5,894,002 | A | | 4/1999 | Boneberger et al. | |
| 5,994,488 | A | | 11/1999 | Yokota et al. | |
| 6,331,578 | B1 | * | 12/2001 | Turner | C08F 283/12 523/105 |
| 6,367,929 | B1 | | 4/2002 | Maiden et al. | |
| 6,627,124 | B1 | | 9/2003 | Herbrechtsmeier et al. | |
| 6,719,929 | B2 | | 4/2004 | Winterton et al. | |
| 6,800,225 | B1 | | 10/2004 | Hagmann et al. | |
| 6,822,016 | B2 | | 11/2004 | McCabe et al. | |
| 6,858,218 | B2 | | 2/2005 | Lai et al. | |
| 6,867,245 | B2 | | 3/2005 | Iwata et al. | |
| 7,052,131 | B2 | | 5/2006 | McCabe et al. | |
| 7,249,848 | B2 | | 7/2007 | Laredo et al. | |
| 7,384,590 | B2 | | 6/2008 | Kelly et al. | |
| 7,387,759 | B2 | | 6/2008 | Kelly et al. | |
| 7,605,190 | B2 | | 10/2009 | Moszner et al. | |
| 7,671,156 | B2 | | 3/2010 | Phelan et al. | |
| 7,744,785 | B2 | | 6/2010 | Phelan | |
| 7,858,000 | B2 | | 12/2010 | Winterton | |
| 7,915,323 | B2 | | 3/2011 | Awasthi et al. | |
| 8,129,442 | B2 | | 3/2012 | Ueyama et al. | |
| 8,147,897 | B2 | | 4/2012 | Ferreiro et al. | |
| 8,163,206 | B2 | | 4/2012 | Chang et al. | |
| 8,409,599 | B2 | | 4/2013 | Wu et al. | |
| 8,420,711 | B2 | | 4/2013 | Awasthi et al. | |
| 8,445,614 | B2 | | 5/2013 | Francis et al. | |
| 8,481,662 | B2 | | 7/2013 | Liu et al. | |
| 8,487,058 | B2 | | 7/2013 | Liu et al. | |
| 8,501,833 | B2 | | 8/2013 | Phelan | |

(Continued)

FOREIGN PATENT DOCUMENTS

EP 0632329 A1 1/1995
EP 2107078 A1 10/2009

(Continued)

OTHER PUBLICATIONS

Takashi Aoki, Masahiko Kawashima, Hiroki Katono, Kohei Sanui, Naoya Ogata, Teruo Okano, & Yasuhisa Sakurai; Temperature-Responsive Interpenetrating Polymer Networks Constructed with Poly(acrylic acid) and Poly (N,N-dimethylacrylamide); Macromolecules, 1994, American Chemical Society, vol. 27, No. 4, pp. 947-952.

Primary Examiner — Peter A Salamon
(74) Attorney, Agent, or Firm — Jian Zhou

(57) ABSTRACT

The invention provides a hydrophilized polydiorganosiloxane vinylic crosslinker which comprises (1) a polydiorganosiloxane polymer chain comprising dimethylsiloxane units and hydrophilized siloxane unit having one methyl substituent and one monovalent $C_{10}$-$C_{50}$ organic substituent having two or three carboxy groups, wherein the molar ratio of the hydrophilized siloxane units to the dimethylsiloxane units is from about 0.035 to about 0.25, and (2) two terminal (meth)acryloyl groups. The hydrophilized polydiorganosiloxane vinylic crosslinker has a number average molecular weight of greater than 3000 Daltons. The present invention is also related to a silicone hydrogel contact lens, which comprises repeating units derived from a hydrophilized polydiorganosiloxane vinylic crosslinker of the invention. In addition, the invention provides a method for making silicone hydrogel contact lenses using a lens-forming formulation comprising hydrophilized polydiorganosiloxane vinylic crosslinker of the invention.

17 Claims, No Drawings

(56) References Cited

U.S. PATENT DOCUMENTS

| | | | |
|---|---|---|---|
| 8,513,325 B2 | 8/2013 | Liu et al. | |
| 8,524,850 B2 | 9/2013 | Ueyama et al. | |
| 8,658,747 B2 | 2/2014 | Liu et al. | |
| 8,658,748 B2 | 2/2014 | Liu et al. | |
| 8,835,525 B2 * | 9/2014 | Kuyu | C08G 77/42 523/107 |
| 8,865,789 B2 | 10/2014 | Yao et al. | |
| 8,993,651 B2 | 3/2015 | Chang et al. | |
| 9,052,440 B2 * | 6/2015 | Kuyu | C08G 77/42 |
| 9,097,840 B2 | 8/2015 | Chang et al. | |
| 9,103,965 B2 | 8/2015 | Chang | |
| 9,121,998 B2 | 9/2015 | Chen et al. | |
| 9,187,601 B2 | 11/2015 | Huang et al. | |
| 9,475,827 B2 | 10/2016 | Chang et al. | |
| 2003/0162862 A1 * | 8/2003 | McCabe | A61L 27/18 523/106 |
| 2003/0188841 A1 * | 10/2003 | Buder | A61K 8/0208 162/179 |
| 2003/0212231 A1 | 11/2003 | Olier | |
| 2007/0066706 A1 * | 3/2007 | Manesis | G02B 1/043 523/106 |
| 2009/0234089 A1 * | 9/2009 | Ueyama | C08F 8/42 526/279 |
| 2010/0014047 A1 | 1/2010 | Chang et al. | |
| 2010/0063237 A1 * | 3/2010 | Dhruv | C08J 3/20 528/32 |
| 2010/0089540 A1 * | 4/2010 | Buder | A61K 8/0208 162/162 |
| 2011/0134387 A1 | 6/2011 | Samuel et al. | |
| 2012/0026457 A1 | 2/2012 | Qiu et al. | |
| 2012/0088843 A1 | 4/2012 | Chang et al. | |
| 2012/0088844 A1 * | 4/2012 | Kuyu | C08G 77/42 514/772.3 |
| 2012/0244088 A1 | 9/2012 | Saxena et al. | |
| 2012/0245249 A1 | 9/2012 | Saxena et al. | |
| 2013/0118127 A1 | 5/2013 | Kolluru et al. | |
| 2014/0018465 A1 * | 1/2014 | Liu | G02B 1/043 523/107 |
| 2014/0350124 A1 * | 11/2014 | Kuyu | C08G 77/42 514/772.1 |
| 2015/0309210 A1 | 10/2015 | Huang et al. | |
| 2015/0309211 A1 | 10/2015 | Huang et al. | |
| 2016/0090432 A1 | 3/2016 | Chang et al. | |

FOREIGN PATENT DOCUMENTS

| | | |
|---|---|---|
| EP | 2602279 A1 | 6/2013 |
| WO | 2016145204 A1 | 9/2016 |

* cited by examiner

POLYMERIZABLE POLYSILOXANES WITH HYDROPHILIC SUBSTITUENTS

This application claims the benefit under 35 USC § 119 (e) of U.S. provisional application No. 62/267,312 filed 15 Dec. 2015, herein incorporated by reference in its entirety.

The present invention is related to a class of polymerizable polysiloxaness with hydrophilic substituents and uses thereof. In particular, the present invention is related to silicone hydrogel contact lenses made from a lens formulation including a polymerizable polysiloxane with hydrophilic substituents.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

One of lens forming materials widely used in making silicone hydrogel contact lenses is a polydiorganosiloxane (e.g., polydimethylsiloxane) vinylic crosslinker which can provide high oxygen permeability to resultant contact lenses. But, a polydimethylsiloxane vinylic crosslinker can affect the mechanical properties, e.g., elastic modulus, of the resultant contact lenses. For example, a low molecular weight polydimethylsiloxane vinylic crosslinker (<2,000 g/mol) may provide a resultant contact lens with a relatively high elastic modulus in order to achieve a desired oxygen permeability. A relative high molecular weight polydimethylsiloxane vinylic crosslinker is typically used in achieve both the high oxygen permeability and the low elastic modulus. However, because of its hydrophobic nature, a polydimethylsiloxane vinylic crosslinker, especially one with high molecular weight, is not compatible with hydrophilic components in a lens formulation, including, e.g., N,N-dimethylacrylamide (DMA), N-vinylpyrrolidone (NVP), N-vinyl-N-methylacetamide (VMA), or an internal wetting agent including a non-polymerizable hydrophilic polymer (e.g., polyvinylpyrrolidone or poly(N,N-dimethylacrylamide). It would be difficult to obtain homogeneous lens formulations.

Therefore, there is a need for new actinically-polymerizable polysiloxanes suitable for making silicone hydrogel contact lenses.

U.S. Pat. Nos. 4,260,725, 5,034,461, 5,346,946, 5,416,132, 5,449,729, 5,486,579, 5,512,205, 5,760,100, 5,994,488, 6,858,218, 6,867,245, 7,671,156, 7,744,785, 8,129,442, 8,163,206, 8,501,833, 8,513,325, 8,524,850, 8,835,525, 8,993,651, and 9,187,601 and U.S. patent application Ser. No. 14/859,486, disclose that various lens formulations (which are either solvent-containing or solventless formulations) comprising one or more hydrophilized polysiloxane crosslinkers can be used for making silicone hydrogel contact lenses. U.S. Pat. Nos. 6,367,929, 6,822,016, 7,052,131 and 7,249,848 disclose silicone hydrogel contact lenses including leacheable hydrophilic polymers as internal wetting agents.

SUMMARY OF THE INVENTION

The present invention, in one aspect, provides a hydrophilized polysiloxane vinylic crosslinker. The hydrophilized polydiorganosiloxane vinylic crosslinker of the invention comprises: (1) a polydiorganosiloxane polymer chain comprising dimethylsiloxane units and hydrophilized siloxane unit having one methyl substituent and one monovalent $C_{10}$-$C_{50}$ organic substituent having at least two carboxy groups, wherein the molar ratio of the hydrophilized siloxane units to the dimethylsiloxane units is from about 0.035 to about 0.25; (2) two terminal (meth)acryloyl groups, wherein the hydrophilized polydiorganosiloxane vinylic crosslinker has a number average molecular weight of greater than 3000 Daltons.

In another aspect, the invention provides a silicone hydrogel contact lens comprising a crosslinked polymeric material comprising: units of a hydrophilized polydiorganosiloxane vinylic crosslinker of the invention (described above); units of a siloxane-containing vinylic monomer; units of at least one hydrophilic vinylic monomer; and a hydrophilic polymer which is not covalently attached onto the crosslinked polymeric material, wherein the silicone hydrogel contact lens, when being fully hydrated, has an oxygen permeability (Dk) of at least about 70 barrers, a water content of from about 25% to about 70% by weight, an elastic modulus of from about 0.2 MPa to about 1.2 MPa, a water-break-up time of at least about 15 seconds, and a water contact angle of about 90 degrees or less.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises (a) from about 5% to about 35% by weight of a hydrophilized polydiorganosiloxane vinylic crosslinker of the invention, (b) a siloxane-containing vinylic monomer, (c) from about 30% to about 60% by weight of at least one hydrophilic vinylic monomer, (d) a hydrophilic polymer free of any ethylenically unsaturated group, and (e) at least one free-radical initiator, provided that the above-listed polymerizable components and any additional polymerizable components add up to 100% by weight; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa, a water-break-up time of at least about 15 seconds, and a water contact angle of about 90 degrees or less.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a crosslinked polymeric material which is insoluble in water, but can absorb at least 10 percent by weight of water.

A "silicone hydrogel" refers to a silicone-containing hydrogel obtained by copolymerization of a polymerizable composition comprising at least one silicone-containing vinylic monomer or at least one silicone-containing vinylic macromer or at least one actinically-crosslinkable silicone-containing prepolymer.

"Hydrophilic," as used herein, describes a material or portion thereof that will more readily associate with water than with lipids.

A "vinylic monomer" refers to a compound that has one sole ethylenically unsaturated group and is soluble in a solvent.

The term "soluble", in reference to a compound or material in a solvent, means that the compound or material can be dissolved in the solvent to give a solution with a concentration of at least about 0.5% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

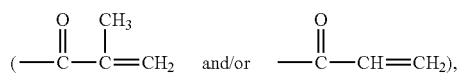

allyl, vinyl, styrenyl, or other C=C containing groups.

The term "ene group" refers to a monovalent radical comprising CH$_2$=CH— that is not covalently attached to an oxygen or nitrogen atom or a carbonyl group.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

The term "(meth)acryloxy" refers to a group of

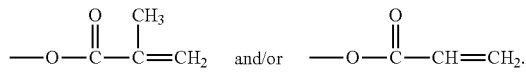

The term "(meth)acrylamido" refers to a group of

in which R' is hydrogen or $C_1$-$C_{10}$-alkyl.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "blending vinylic monomer" refers to a vinylic monomer capable of dissolving both hydrophilic and hydrophobic components of a polymerizable composition to form a solution.

A "macromer" or "prepolymer" refers to a compound or polymer that contains ethylenically unsaturated groups and has an average molecular weights greater than 700 Daltons.

A "polymer" means a material formed by polymerizing/crosslinking one or more vinylic monomers, macromers and/or prepolymers.

"Molecular weight" of a polymeric material (including monomeric or macromeric materials), as used herein, refers to the number-average molecular weight unless otherwise specifically noted or unless testing conditions indicate otherwise.

The term "low molecular weight" in reference to a hydrophilic polymer chain means that the polymer chain has an average molecular weight of from 250 to 100,000 Daltons, preferably from 400 to 50,000 Daltons, more preferably from 500 to 250,000 Daltons, even more preferably from 750 to 150,000 Daltons, and is based on the average molecular weight of a starting hydrophilic polymer before being attached to a polysiloxane.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxyl, —NH$_2$, sulfhydryl, $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, the term "siloxane unit" refers to a divalent radical of —Si($^1$R$^2$R)—O— which has only two substituents, $^1$R and $^2$R which independently of each other are monovalent organic radicals and covalently linked to the silicon atom of the siloxane unit.

The term "monovalent organic radical" refers to a monovalent radical obtained by removing a hydrogen atom from an organic compound.

In this application, the term "methyl substituent" in reference to a siloxane unit refers to a methyl radical directly linked to the silicon atom of the siloxane unit; the term "monovalent $C_{10}$-$C_{50}$ organic radical substituent" in reference to a siloxane unit refers to a monovalent organic radical which comprises 10 to 50 carbon atoms and is directly linked to the silicon atom of the siloxane unit.

In this application, the term "hydrophilized siloxane unit" refers to a siloxane unit in which one of the two substituents on the silicon atom of the siloxane unit is monovalent $C_{10}$-$C_{50}$ organic radical having at least one hydrophilic group or moiety (such as, hydroxyl, methoxy, carboxyl or amino group, or amide or amino bond).

In this application, a "hydrophilized polydiorganosiloxane vinylic crosslinker" refers to a polydiorganosiloxane vinylic crosslinker comprising at least one hydrophilized siloxane unit.

As used herein, the term "multiple" refers to three or more.

A "vinylic crosslinker" refers to a compound having at least two ethylenically-unsaturated groups. A "vinylic crosslinking agent" refers to a compound with two or more ethylenically unsaturated groups and with molecular weight less than 700 Daltons.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "polymerizable UV-absorbing agent" or "UV-absorbing vinylic monomer" refers to a compound comprising an ethylenically-unsaturated group and a UV-absorbing moiety.

A "UV-absorbing moiety" refers to an organic functional group which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g., UV/visible) permeable region, a radiation (e.g., UV/visible) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is any radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surfaces of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Dye" means a substance that is soluble in a lens-forming fluid material and that is used to impart color. Dyes are typically translucent and absorb but do not scatter light.

A "pigment" means a powdered substance (particles) that is suspended in a lens-forming composition in which it is insoluble.

"Surface modification" or "surface treatment", as used herein, means that an article has been treated in a surface treatment/modification process prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Pat. Appl. Pub. Nos. 2011/0134387, 2012/0026457 and 2013/0118127 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (measured by Sessile Drop), which is obtained by averaging measurements of at least 3 individual contact lenses.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

As used in this application, the term "clear" in reference to a lens-forming composition means that the lens-forming composition is a transparent solution or liquid mixture (i.e., having a light transmissibility of 85% or greater, preferably 90% or greater in the range between 400 to 700 nm).

In general, the invention is directed to a class of hydrophilized polydiorganosiloxane vinylic crosslinkers which each comprise (1) a polydiorganosiloxane polymer chain comprising dimethylsiloxane units and hydrophilized siloxane unit having one methyl substituent and one monovalent $C_{10}$-$C_{50}$ organic substituent having at least two carboxy groups, wherein the molar ratio of the hydrophilized siloxane units to the dimethylsiloxane units is from about 0.035 to about 0.25; (2) two terminal (meth)acryloyl groups, wherein the hydrophilized polydiorganosiloxane vinylic crosslinker has an average molecular weight of greater than 3000 Daltons.

There are several potential unique features associated with use of hydrophilized polydiorganosiloxane vinylic crosslinkers of the invention in making silicone hydrogel contact lens.

First, a hydrophilized polydiorganosiloxane vinylic crosslinker of the invention is more compatible with other hydrophilic polymerizable components (e.g., hydrophilic vinylic monomer, hydrophilic crosslinking agent, and/or hydrophilic prepolymer), because of the presence of a relatively-large amount of carboxy groups per molecule. Because carboxy groups are highly capable of forming H-bonds with other hydrophilic groups, a hydrophilized polydiorganosiloxane vinylic crosslinker of the invention is suitable for preparing various solvent-containing or solventless lens formulations which can contain a large amount of hydrophilic polymerizable component and are still clear at room temperature or even at a low storage temperature of from about 0° C. to about 4° C. Such a lens formulation can be advantageously prepared in advance in the production.

Second, it is believed that a hydrophilized polydiorganosiloxane vinylic crosslinker of the invention may form a complex with hydrophilic (co)polymers through H-bonding or dipole-dipole interaction, like polyacrylic acid which can form H-bond complexes with hydrophilic H-bond acceptor polymers like PVP or polyDMA (*Macromolecules* 1994, 27, 947-952). The carboxylic acid groups can also form ionic complexes with more basic polymers like PEI and poly-vinylamine. Because of H-bonding or dipole-dipole interaction, a hydrophilized polydiorganosiloxane vinylic crosslinker of the invention may be compatible with a hydrophilic polymer (free of any ethylenically unsaturated groups) in a lens-forming composition. After the formulation is cured, the hydrophilic polymer can still retain in the silicone hydrogel network but may slowly migrate toward to lens surface and provide final lens with wettable and lubricious surface property.

Third, by packing carboxy groups into a limited number of siloxane units, one can ensure that a resultant polydiorganosiloxane vinylic crosslinker can have sufficient siloxane segments consisting of more than 5 consecutive dimethylsiloxane units. It is believed that in order to achieve a higher oxygen permeably, a polydiorganosiloxane should have at least 5 dimethylsiloxane units in a consecutive sequence. Such a polydiorganosiloxane vinylic crosslinker may be used to efficiently provide relatively-high oxygen permeability per siloxane unit without adversely affecting its compatibility with other hydrophilic polymerizable components.

The present invention, in one aspect, provides a hydrophilized polydiorganosiloxane vinylic crosslinker. The hydrophilized polydiorganosiloxane vinylic crosslinker of the invention comprises: (1) a polydiorganosiloxane polymer chain comprising dimethylsiloxane units and hydrophilized siloxane unit having one methyl substituent and one monovalent $C_{10}$-$C_{50}$ organic substituent having at least two carboxy groups, wherein the molar ratio of the hydrophilized siloxane units to the dimethylsiloxane units is from about 0.035 to about 0.25; (2) two terminal (meth)acryloyl groups, wherein the hydrophilized polydiorganosiloxane vinylic crosslinker has an average molecular weight of at least about 3000 Daltons (preferably from about 4000 Daltons to about 80,000 Daltons, more preferably from about 5000 Daltons to about 50,000 Dalton, even more preferably from about 6000 Daltons to about 25,000 Daltons, most preferably from about 7000 Daltons to about 18,000 Daltons).

In accordance with the invention, the hydrophilized polydiorganosiloxane vinylic crosslinker is preferable a polymer of formula (1)

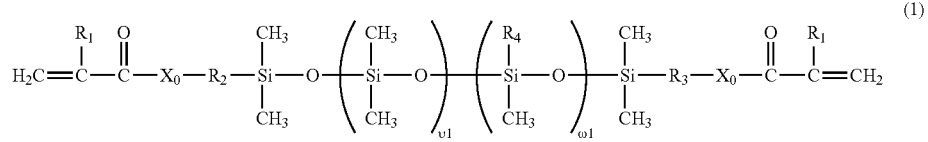

(1)

in which:
υ1 is an integer of from 30 to 500 and ω1 is an integer of from 1 to 75, provided that ω1/υ1 is from about 0.035 to about 0.25 (preferably from about 0.040 to about 0.18, even more preferably from about 0.045 to about 0.18);
$X_0$ is O or NR' in which R' is hydrogen or $C_1$-$C_{10}$-alkyl;
$R_1$ is hydrogen or methyl;
$R_2$ and $R_3$ independently of each other are a substituted or unsubstituted $C_2$-$C_6$ alkylene divalent radical or a divalent radical of —$R_5$—O—$R_6$— in which $R_5$ and $R_6$ independently of each other are a substituted or unsubstituted $C_2$-$C_6$ alkylene divalent radical;
$R_4$ is a monovalent radical of formula (2)

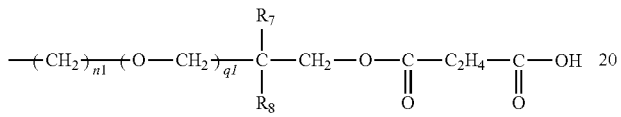

(2)

q1 is zero or 1;
n1 is an integer of 2 to 4;
$R_7$ is hydrogen, methyl, or a radical of

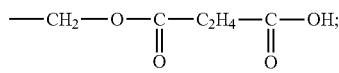

$R_8$ is ethyl or a radical of

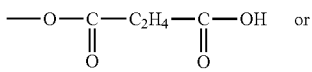

or

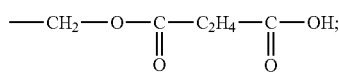

provided that at least one of $R_7$ and $R_8$ is a radical of

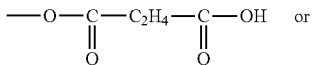

or

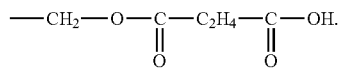

In a preferred embodiment, the monovalent radical $R_4$ is of formula (2) in which n1 is 3, q1 is 1, $R_7$ is hydrogen, $R_8$ is a radical of

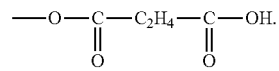

In another preferred embodiment, the monovalent radical $R_4$ is of formula (2) in which n1 is 3, q1 is 1, $R_7$ is a radical of

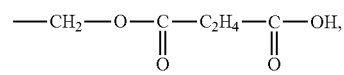

$R_8$ is ethyl.

In another preferred embodiment, the monovalent radical $R_4$ is of formula (2) in which n1 is 3, q1 is 1, $R_7$ and $R_8$ are a radical of

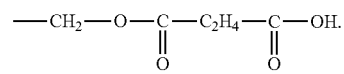

A hydrophilized polydiorganosiloxane vinylic crosslinker of formula (1) can be prepared in a three-step process.

In the first step, a hydrosiloxane-containing polysiloxane of

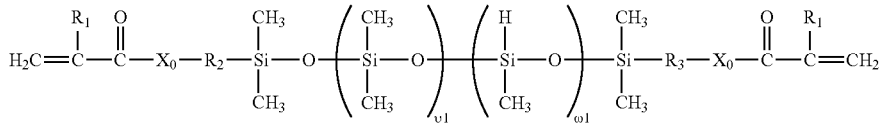

in which $X_0$, $R_1$, $R_2$, $R_3$, υ1, and ω1 are as defined above, is prepared according to any methods known to a person skilled in the art. As an illustrative example, a hydrosiloxane-containing polysiloxane of formula (3) can be prepared from polymerization of a mixture of octamethylcyclotetrasiloxane (D4) and 1,3,5,7-tetramethylcyclotetrasiloxane (H4) in presence of 1,3-bis[3-(meth)acryloxypropyl] tetramethyldisiloxane (or the like) as a chain end block and in the presence of a catalyst. By controlling the molar ratio of D4 to H4, a desired value of υ1/ω1 can be obtained.

In the second step, the hydrosiloxane-containing polydiorganosiloxane obtained in step 2 is reacted with an ene monomer containing two or three hydroxyl groups, in a platinum-catalyzed hydrosilylation reaction as known to a person skilled in the art, to obtain a polydiorganosiloxane containing hydrophilized siloxane units each comprising one organic substituent having 2 to 3 hydroxyl group. The ene monomer containing 2 or three hydroxyl groups preferred is 3-allyoxy-1,2-propanediol, 2-allyloxymethyl-2-(hydroxymethyl)-1,3-propanediol, 2-allyloxymethyl-2-ethyl-1,3-propanediol (i.e., trimethylolpropaneallylether), or a fully-hydrolized (i.e., ring-opening) product of an epoxy-containing ene monomer which is allyloxy glycidyl ether, 1,2-ppoxy-5-hexene, 3,4-epoxy-1-butene, or 2-methyl-2-vinyloxirane. The above-listed ene monomers are commercially available.

In the third step, the obtained polydiorganosiloxane containing hydrophilized siloxane units each comprising one organic substituent having 2 to 3 hydroxyl group is reacted with succinic anhydrade to obtain a hydrophilized polydiorganosiloxane vinylic crosslinker of formula (1).

A hydrophilized polydiorganosiloxane vinylic crosslinker of the invention (formula (1) as defined above) can find particular use in preparing a polymer, preferably a silicone hydrogel polymeric material, which is another aspect of the invention. A person skilled in the art knows how to prepare a polymer or a silicone hydrogel polymeric material from a polymerizable composition according to any known polymerization mechanism.

In another aspect, the invention provides a silicone hydrogel contact lens comprising a crosslinked polymeric material comprising: units of a hydrophilized polydiorganosiloxane vinylic crosslinker of formula (1) (described above); units of a siloxane-containing vinylic monomer; units of at least one hydrophilic vinylic monomer; and a hydrophilic polymer which is not covalently attached onto the crosslinked polymeric material but is physically entrapped within the crosslinked polymeric material, wherein the silicone hydrogel contact lens, when being fully hydrated, has an oxygen permeability (Dk) of at least about 70 barrers, a water content of from about 25% to about 70% by weight, an elastic modulus of from about 0.2 MPa to about 1.2 MPa, a water-break-up time of at least about 15 seconds, and a water contact angle of about 90 degrees or less.

A person skilled in the art knows well how to measure the oxygen permeability, oxygen transmissibility, water content, elastic modulus, and lens diameter of silicone hydrogel contact lenses. These lens properties have been reported by all manufacturers for their silicone hydrogel contact lens products.

Various embodiments of a hydrophilized polydiorganosiloxane vinylic crosslinker of formula (1) (as defined above) should be incorporated into this aspect of the invention.

Any suitable siloxane-containing vinylic monomers can be used in the invention. A class of preferred siloxane-containing vinylic monomers is those containing a tris(trialkylsiloxy)silyl group or a bis(trialkylsilyloxy)alkylsilyl group. Examples of such preferred silicone-containing vinylic monomers include without limitation 3-acrylamidopropyl-bis(trimethylsiloxy)methylsilane, 3-N-methyl acrylamidopropylbis(trimethylsiloxy)methylsilane, N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl) propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxyethoxypropyloxy-propyl-bis(trimethylsiloxy) methylsilane, N-2-methacryloxyethyl-O-(methyl-bis-trimethylsiloxy-3-propyl)silylcarbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate, trimethylsilylethyl vinyl carbonate, trimethylsilylmethyl vinyl carbonate, and hydrophlized siloxane-containing vinylic monomers disclosed in U.S. Pat. Nos. 9,103,965, 9,475,827, and 9,097,840 (herein incorporated by references in their entireties) which comprise at least one hydrophilic linkage and/or at least one hydrophilic chain.

Another class of preferred siloxane-containing vinylic monomers is polycarbosiloxane vinylic monomers (or carbosiloxane vinylic monomers). Examples of such polycarbosiloxane vinylic monomers or macromers are those described in U.S. Pat. Nos. 7,915,323 and 8,420,711, in US Patent Application Publication Nos. 2012/244088, 2012/245249, 2015/0309211, and 2015/0309210 (herein incorporated by references in their entireties).

A further class of preferred siloxane-containing vinylic monomers is polydimethylsiloxane-containing vinylic monomers. Examples of such polydimethylsiloxane-containing vinylic monomers are mono-(meth)acryloxy-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane), mono-(meth)acrylamido-terminated polydimethylsiloxanes of various molecular weight, or combinations thereof.

In accordance with the invention, a siloxane-containing vinylic monomer is preferably 3-(meth)acryloxy-2-hydroxypropyloxy)propylbis(trimethylsiloxy)methylsilane, 3-(meth)acryloxyethoxypropyloxypropylbis(trimethylsiloxy)methylsilane, 3-(meth)acrylamidopropyl-bis(trimethylsiloxy)methylsilane, 3-N-methyl (meth)acrylamidopropylbis(trimethylsiloxy) methylsilane, mono-(meth)acryloxy-terminated polydimethylsiloxanes of various molecular weight, mono-(meth)acrylamido-terminated polydimethylsiloxanes of various molecular weight, or a combination thereof.

It is understood that the crosslinked polymeric material of a silicone hydrogel contact lens of the invention can optionally comprise a polydimethylsiloxane vinylic crosslinker so long it is compatible with the hydrophilic polymerizable components in a lens-forming composition for making the silicone hydrogel contact lens.

Examples of preferred hydrophilic vinylic monomers include without limitation N-vinylpyrrolidone, N,N-dimethyl (meth)acrylamide, (meth)acrylamide, hydroxyethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a number average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3- methylene-2-pyrrolidone, (meth)acrylic acid, ethylacrylic acid, and combinations thereof. Preferably, the hydrophilic vinylic monomer is a hydrophilic N-vinyl monomer, such as, N-vinylpyrrolidone, N-vinyl-N-methyl acetamide, N-vinyl formamide, N-vinyl acetamide, N-vinyl isopropylamide, or combinations thereof. Even more preferably, the hydrophilic vinylic monomer is N-vinylpyrrolidone, N-vinyl-N-methyl acetamide, or combinations thereof.

Any non-crosslinkable hydrophilic polymers or copolymers (i.e., without any ethylenically unsaturated groups) can be used. By being physically entrapped within the polymer matrix of silicone hydrogel contact lense, especially with the help of the carboxy groups of the hydrophilized polydiorganosiloxane vinylic crosslinker, such a non-crosslinkable hydrophilic polymer can slowly migrate toward to lens surface and provide final lens with wettable and lubricious surface property. Preferred examples of non-crosslinkable hydrophilic polymers include, but are not limited to, a polyvinyl alcohol, a polyamide, a polyimide, a polylactone, a homopolymer of N-vinylpyrrolidone, a copolymer of N-vinylpyrrolidone and one or more hydrophilic vinylic comonomers, a homopolymer of N-vinyl-N-methyl acetamide, a copolymer of N-vinyl-N-methyl acetamide and one or more hydrophilic vinylic comonomers, polyacrylamide, polymethacrylamide, a copolymer of acrylamide with one or more hydrophilic vinylic monomers, a copolymer of methacrylamide with one or more hydrophilic vinylic monomers, polyethylene oxide, poly-N—N-dimethylacrylamide, polyacrylic acid, poly(2-ethyl oxazoline), heparin polysaccharides, polysaccharides, and mixtures thereof. The number average molecular weight $M_w$ of the non-crosslinkable hydrophilic polymer is preferably from 5,000 to 500,000, more preferably from 10,000 to 300,000, even more preferably from 20,000 to 100,000. Preferably, polyvinylpyrrolidone, poly(N-vinyl-N-methyl acetamide), polyacrylamide, poly-N—N-dimethylacrylamide, or a combination thereof is used.

In accordance with the invention, the crosslinked polymeric material of a silicone hydrogel contact lens of the invention can further comprise units of a hydrophobic vinylic monomer free of silicone, units of a non-silicone vinylic crosslinker, units of a UV-absorbing vinylic monomer, or a combination thereof.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred non-silicone crosslinkers include without limitation tetraethyleneglycol di-(meth)acrylate, triethyleneglycol di-(meth)acrylate, diethyleneglycol di-(meth)acrylate, ethyleneglycol di-(meth)acrylate, tetraethyleneglycol divinyl ether, triethyleneglycol divinyl ether, diethyleneglycol divinyl ether, ethyleneglycol divinyl ether, trimethylopropane trimethacrylate, pentaerythritol tetramethacrylate, bisphenol A dimethacrylate, vinyl methacrylate, ethylenediamine di-(meth)acrylamide, glycerol dimethacrylate, triallyl isocyanurate, triallyl cyanurate, allyl (meth) acrylate, N-allyl-(meth)acrylamide, 1,3-bis(methacrylamidopropyl)-1,1,3,3-tetrakis(trimethylsiloxy)disiloxane, N,N'-methylenebisacrylamide, N,N'-methylenebismethacrylamide, N,N'-ethylenebisacrylamide, N,N'-ethylenebismethacrylamide, a product of diamine (preferably selected from the group consisting of N,N'-bis (hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, isophorone diamine, and combinations thereof) and epoxy-containing vinylic monomer (preferably selected from the group consisting of glycidyl (meth) acrylate, vinyl glycidyl ether, allyl glycidyl ether, and combinations thereof), combinations thereof. A more preferred crosslinker is selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, glycerol dimethacrylate, allyl (meth)acrylate, N,N'-methylene bis(meth)acrylamide, N,N'-ethylene bis(meth)acrylamide, N,N'-dihydroxyethylene bis(meth)acrylamide, triallyl isocyanurate, tetraethyleneglycol divinyl ether, triethyleneglycol divinyl ether, diethyleneglycol divinyl ether, ethyleneglycol divinyl ether, and combinations thereof.

Examples of preferred UV-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-(2'-hydroxy-5'-methacryloxyethyl phenyl) benzotriazole (2-Propenoic acid, 2-methyl-, 2-[3-(2H-benzotriazol-2-yl)-4-hydroxyphenyl] ethyl ester, Norbloc), 2-{2'-Hydroxy-3'-tert-butyl-5'-[3'-methacryloyloxypropoxy]phenyl}-5-methoxy-2H-benzotriazole (UV13), 2-[2'-Hydroxy-3'-tert-butyl-5'-(3'-acryloyloxypropoxy)phenyl]-5-trifluoromethyl-2H-benzotriazole ($CF_3$-UV13), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS#96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS#1260141-20-5); 2-[2-Hydroxy-5-[3-(methacryloy-loxy)propyl]-3-tert-butylphenyl]-5-chloro-2H-benzotriaz-ole; Phenol, 2-(5-ethenyl-2H-benzotriazol-2-yl)-4-methyl-, homopolymer (901) (CAS#83063-87-0).

A silicone hydrogel contact lens can be prepared from a lens-forming composition according to a method of the invention which is another aspect of the invention.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises (a) from about 5% to about 35% by weight of a hydrophilized polydiorganosiloxane vinylic crosslinker of the invention, (b) a siloxane-containing vinylic monomer, (c) from about 30% to about 60% by weight of at least one hydrophilic vinylic monomer, (d) a hydrophilic polymer which is free of any ethylenically unsaturated group, and (e) at least one free-radical initiator, provided that the above-listed polymerizable components and any additional polymerizable components add up to 100% by weight; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa, a water-break-up time of at least about 15 seconds, and a water contact angle of about 90 degrees or less.

Various embodiments described above of a hydrophilized polydiorganosiloxane vinylic crosslinker of formula (1) (as defined above) should be incorporated into this aspect of the invention.

Various embodiments described above of a siloxane-containing vinylic monomer, a hydrophilic vinylic monomer, a non-crosslinkable hydrophilic polymer should be incorporated in this aspect of the invention.

In accordance with the invention, a free-radical initiator can be a thermal initiator or hotoinitiator.

Suitable thermal polymerization initiators are known to the skilled artisan and comprise, for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis (isobutyronitrile) (AIBN), 1,1-azodiisobutyramidine, 1,1'-azo-bis (1-cyclohexanecarbonitrile), 2,2'-azo-bis(2,4-dimethyl-valeronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiator can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190 (herein incorporated by reference in its entirety). Preferably, the monomer of lens-forming materials comprises at least one of the following acylgermanium compounds.

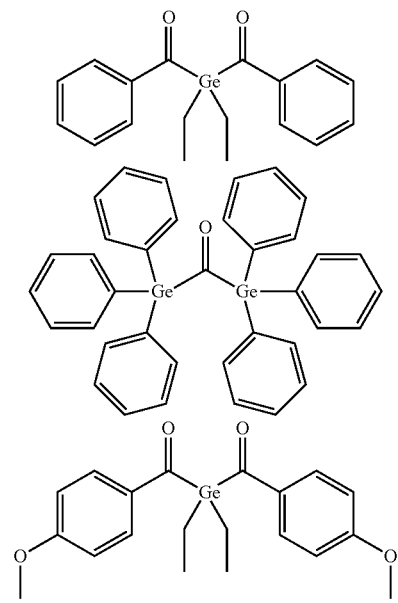

In a preferred embodiment, the lens-forming composition comprises an organic solvent.

Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In another preferred embodiment, the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof. Preferably, the blending vinylic monomer is methylmethacrylate.

In another preferred embodiment, the total amount of all silicone-containing polymerizable components present in the lens-forming composition is about 65% or less.

In another preferred embodiment, the hydrophilic vinylic monomer is a hydrophilic N-vinyl monomer, preferably is N-vinylpyrrolidone, N-vinyl-N-methyl acetamide, N-vinyl formamide, N-vinyl acetamide, N-vinyl isopropylamide, or combinations thereof, even more preferably is N-vinylpyrrolidone, N-vinyl-N-methyl acetamide, or combinations thereof.

In another preferred embodiment, the lens-forming composition further comprises a non-silicone vinylic crosslinker. Various embodiments described above of a siloxane-containing vinylic monomer, a hydrophilic vinylic monomer should be incorporated in this aspect of the invention. The amount of a non-silicone vinylic crosslinker used is expressed in the weight content with respect to the total polymerizable components and is preferably in the range from about 0.05% to about 2%, and more preferably in the range from about 0.1% to about 1.5%, even more preferably in the range from about 0.15% to about 1.0%.

In accordance with the invention, the lens-forming composition can further comprise other components, such as, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the lens-forming formulation (or composition) can be introduced (dispensed) into a cavity formed by a mold according to any known methods.

After the lens-forming composition is dispensed into the mold, it is polymerized to produce a contact lens. Cross-linking may be initiated thermally or actinically.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

In a preferred embodiment, the resultant silicone hydrogel contact lens is extracted with water or an aqueous solution.

In another preferred embodiment, the mold is a reusable mold and the lens-forming composition is cured (i.e., polymerized) actinically under a spatial limitation of actinic radiation to form a silicone hydrogel contact lens. Examples of preferred reusable molds are those disclosed in U.S. Pat. Nos. 6,627,124, 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, and combinations thereof.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A hydrophilized polydiorganosiloxane vinylic crosslinker, comprising: (1) a polydiorganosiloxane polymer chain comprising dimethylsiloxane units and hydrophilized siloxane unit having one methyl substituent and one monovalent $C_{10}$-$C_{50}$ organic substituent having at least two carboxy groups, wherein the molar ratio of the hydrophilized siloxane units to the dimethylsiloxane units is from about 0.035 to about 0.25; (2) two terminal (meth)acryloyl groups, wherein the hydrophilized polydiorganosiloxane vinylic crosslinker has a number average molecular weight of at least about 3000 Daltons.

2. The hydrophilized polydiorganosiloxane vinylic crosslinker of invention 1, wherein the hydrophilized polydiorganosiloxane vinylic crosslinker is a polymer of formula (1)

independently of each other are a substituted or unsubstituted $C_1$-$C_{10}$ alkylene divalent radical;

$R_4$ is a monovalent radical of formula (2)

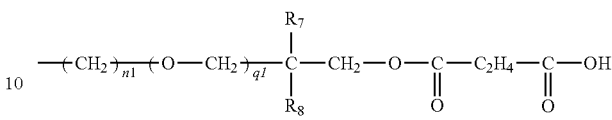

(2)

q1 is zero or 1;
n1 is an integer of 2 to 4;
$R_7$ is hydrogen, methyl, or a radical of

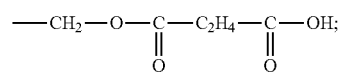

$R_8$ is ethyl or a radical of

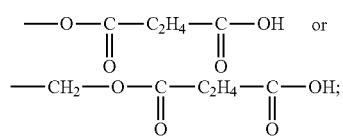

provided that at least one of $R_7$ and $R_8$ is a radical of

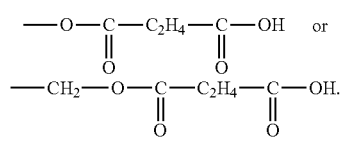

3. The hydrophilized polydiorganosiloxane vinylic crosslinker according to invention 2, wherein in formula (1) ω1/υ1 is from about 0.040 to about 0.18, even more preferably from about 0.045 to about 0.18.

4. The hydrophilized polydiorganosiloxane vinylic crosslinker according to any one of inventions 1 to 3, wherein the hydrophilized polydiorganosiloxane vinylic crosslinker has a number average molecular weight of from

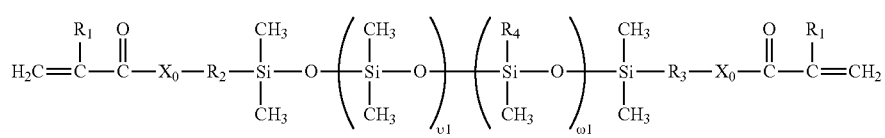

(1)

in which:
υ1 is an integer of from 30 to 500 and ω1 is an integer of from 1 to 75, provided that ω1/υ1 is from about 0.035 to about 0.25;
$X_0$ is O or NR' in which R' is hydrogen or $C_1$-$C_{10}$-alkyl;
$R_1$ is hydrogen or methyl;
$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ about 4000 Daltons to about 80,000 Daltons, more preferably from about 5000 Daltons to about 50,000 Dalton, even more preferably from about 6000 Daltons to about 25,000 Daltons, most preferably from about 7000 Daltons to about 18,000 Daltons.

5. The hydrophilized polydiorganosiloxane vinylic crosslinker according to any one of inventions 1 to 4, wherein in formula (1) $X_0$ is O.

6. The hydrophilized polydiorganosiloxane vinylic crosslinker according to any one of inventions 1 to 4, wherein in formula (1) $X_0$ is NR' in which R' is hydrogen or $C_1$-$C_{10}$-alkyl.
7. The hydrophilized polydiorganosiloxane vinylic crosslinker according to any one of inventions 1 to 6, wherein $R_4$ is of formula (2) in which n1 is 3, q1 is 1, $R_7$ is hydrogen, $R_8$ is a radical of

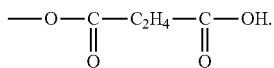

8. The hydrophilized polydiorganosiloxane vinylic crosslinker according to invention 7, wherein $R_4$ is of formula (2) in which n1 is 3, q1 is 1, $R_7$ is a radical of

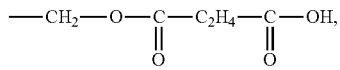

$R_8$ is ethyl.
9. The hydrophilized polydiorganosiloxane vinylic crosslinker according to invention 7, wherein $R_4$ is of formula (2) in which n1 is 3, q1 is 1, $R_7$ and $R_8$ are a radical of

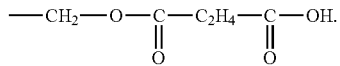

10. A silicone hydrogel contact lens comprising a crosslinked polymeric material which comprises:
    units of a hydrophilized polydiorganosiloxane vinylic crosslinker according to any one of inventions 1 to 9;
    units of a siloxane-containing vinylic monomer;
    units of at least one hydrophilic vinylic monomer; and
    a hydrophilic polymer which is not covalently attached onto the crosslinked polymeric
    material but is physically entrapped within the crosslinked polymeric material, wherein the silicone hydrogel contact lens, when being fully hydrated, has an oxygen permeability (Dk) of at least about 70 barrers, a water content of from about 25% to about 70% by weight, an elastic modulus of from about 0.2 MPa to about 1.2 MPa, a water-break-up time of at least about 15 seconds, and a water contact angle of about 90 degrees or less.
11. The silicone hydrogel contact lens according to invention 10, wherein the hydrophilic vinylic monomer is N-vinylpyrrolidone, N,N-dimethyl (meth)acrylamide, (meth)acrylamide, hydroxylethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a number average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, or combinations thereof.
12. The silicone hydrogel contact lens according to invention 11, wherein the hydrophilic vinylic monomer is N-vinylpyrrolidone, N-vinyl-N-methyl acetamide, or combinations thereof.
13. The silicone hydrogel contact lens according to any one of inventions 10 to 12, wherein the crosslinked polymeric material further comprises units of a hydrophobic vinylic monomer free of silicone, units of a non-silicone vinylic crosslinker, units of a UV-absorbing vinylic monomer, or a combination thereof.
14. The silicone hydrogel contact lens according to any one of inventions 10 to 13, wherein the hydrophilic polymer is a polyvinyl alcohol, a polyamide, a polyimide, a polylactone, a homopolymer of N-vinylpyrrolidone, a copolymer of N-vinylpyrrolidone and one or more hydrophilic vinylic comonomers, a homopolymer of N-vinyl-N-methyl acetamide, a copolymer of N-vinyl-N-methyl acetamide and one or more hydrophilic vinylic comonomers, polyacrylamide, polymethacrylamide, a copolymer of acrylamide with one or more hydrophilic vinylic monomers, a copolymer of methacrylamide with one or more hydrophilic vinylic monomers, polyethylene oxide, poly-N—N-dimethylacrylamide, polyacrylic acid, poly(2-ethyl oxazoline), heparin polysaccharides, polysaccharides, or mixtures thereof.
15. The silicone hydrogel contact lens according to invention 14, wherein the number average molecular weight $M_w$ of the hydrophilic polymer is from 5,000 to 500,000, more preferably from 10,000 to 300,000, even more preferably from 20,000 to 100,000.
16. The silicone hydrogel contact lens according to invention 14 or 15, wherein the hydrophilic polymer is polyvinylpyrrolidone, poly(N-vinyl-N-methyl acetamide), polyacrylamide, poly-N—N-dimethylacrylamide, or a combination thereof.
17. A method for producing silicone hydrogel contact lenses, comprising the steps of: preparing a lens-forming composition which is clear at room temperature and optionally but preferably at a temperature of from about 0 to about 4° C., wherein the lens-forming composition comprises (a) from about 5% to about 35% by weight of a hydrophilized polydiorganosiloxane vinylic crosslinker according to any one of inventions 1 to 9, (b) a siloxane-containing vinylic monomer, (c) from about 30% to about 60% by weight of at least one hydrophilic vinylic monomer, (d) a hydrophilic polymer which is free of any ethylenically unsaturated group, and (e) at least one free-radical initiator, provided that the above-listed polymerizable components and any additional polymerizable components add up to 100% by weight;
introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and
curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa, a water-break-up time of at least about 15 seconds, and a water contact angle of about 90 degrees or less.
18. The method according to invention 17, wherein the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof (preferably, the blending vinylic monomer is methylmethacrylate).

19. The method according to invention 17, wherein the lens-forming composition comprises an organic solvent.

20. The method according to any one of inventions 17 to 19, wherein the total amount of all silicone-containing polymerizable components present in the lens-forming composition is about 65% or less.

21. The method according to any one of inventions 17 to 20, wherein the hydrophilic vinylic monomer is a hydrophilic N-vinyl monomer, preferably is N-vinylpyrrolidone, N-vinyl-N-methyl acetamide, N-vinyl formamide, N-vinyl acetamide, N-vinyl isopropylamide, or combinations thereof, even more preferably is N-vinylpyrrolidone, N-vinyl-N-methyl acetamide, or combinations thereof.

22. The method according to any one of inventions 17 to 21, wherein the hydrophilic polymer is a polyvinyl alcohol, a polyamide, a polyimide, a polylactone, a homopolymer of N-vinylpyrrolidone, a copolymer of N-vinylpyrrolidone and one or more hydrophilic vinylic comonomers, a homopolymer of N-vinyl-N-methyl acetamide, a copolymer of N-vinyl-N-methyl acetamide and one or more hydrophilic vinylic comonomers, polyacrylamide, polymethacrylamide, a copolymer of acrylamide with one or more hydrophilic vinylic monomers, a copolymer of methacrylamide with one or more hydrophilic vinylic monomers, polyethylene oxide, poly-N—N-dimethylacrylamide, polyacrylic acid, poly(2-ethyl oxazoline), heparin polysaccharides, polysaccharides, or mixtures thereof.

23. The method according to invention 22, wherein the number average molecular weight $M_w$ of the hydrophilic polymer is from 5,000 to 500,000, more preferably from 10,000 to 300,000, even more preferably from 20,000 to 100,000.

24. The method according to any one of inventions 22 or 23, wherein the hydrophilic polymer is polyvinylpyrrolidone, poly(N-vinyl-N-methyl acetamide), polyacrylamide, poly-N—N-dimethylacrylamide, or a combination thereof.

25. The method according to any one of inventions 17 to 24, wherein the step of curing is carried thermally.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Ion Permeability Measurements

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

Lubricity Evaluation.

The lubricity of a lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

Surface Wettability Tests.

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wpe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 µl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-Up Time (WBUT) Tests.

The surface hydrophilicity of lenses (after autoclave) is assessed by determining the time required for the water film to start breaking on the lens surface. Briefly, lenses are removed from the vial and placed in PBS (phosphate buffered saline) for at least two rinses of 30 minutes each and then transferred to fresh PBS in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from PBS and are assigned a WBUT of 0 seconds. Lenses exhibiting WBUT≥10 seconds are considered to have a hydrophilic surface and are expected to exhibit adequate wettability (ability to support the tear film) on-eye.

Digital Rubbing Tests.

The lenses are digitally rubbed (wearing disposable powder-free latex gloves) with RENU® multi-purpose lens care solution (or another multi-purpose lens care solution) for 20 seconds and then rinsed with saline. The above procedure is repeated for a given times, e.g., from 1 to 30 times, (i.e., number of repetitions of digital rubbing tests which imitate cleaning and soaking cycles).

Example 2

Synthesis of Glycerol Ether Containing PDMS Macromer

A glycerol ether-containing PDMS macromer is prepared according to the procedures shown in Scheme 1

Synthesis of the Precursor 297.9 g of octamethylcyclotetrasiloxane (M.W. 296.62), 12.0 g of 1,3,5,7-tetramethylcyclotetrasiloxane (M.W. 240.51), 9.7 g of 1,3-bis(3-methacryloxypropyl) tetramethyldisiloxane (M.W. 386.63), and 0.9 g of trifluoromethanesulfonic acid (M.W. 150.08) are weighed into a 500 mL round bottom flask. After the reaction is run at 35° C. for 24 h, 170 mL of 0.5% sodium hydrogen carbonate is added. The collected organic portion is further extracted five times with de-ionized water (170 mL per cycle). Anhydrous MgSO$_4$ is added to the collected organic solution, followed by ~350 mL of additional CHCl$_3$, and the solution is then stirred overnight. After filtration, the solvent is removed via Rotovap, followed by high vacuum. 102 g of final product (the precursor) is obtained.

Hydrosilylation Reaction with 3-Allyloxy-1,2-Propanediol to Form Macromer

A small reactor is connected to a heater and air condenser with drying tube. 21 g of toluene, 15 g of above precursor,

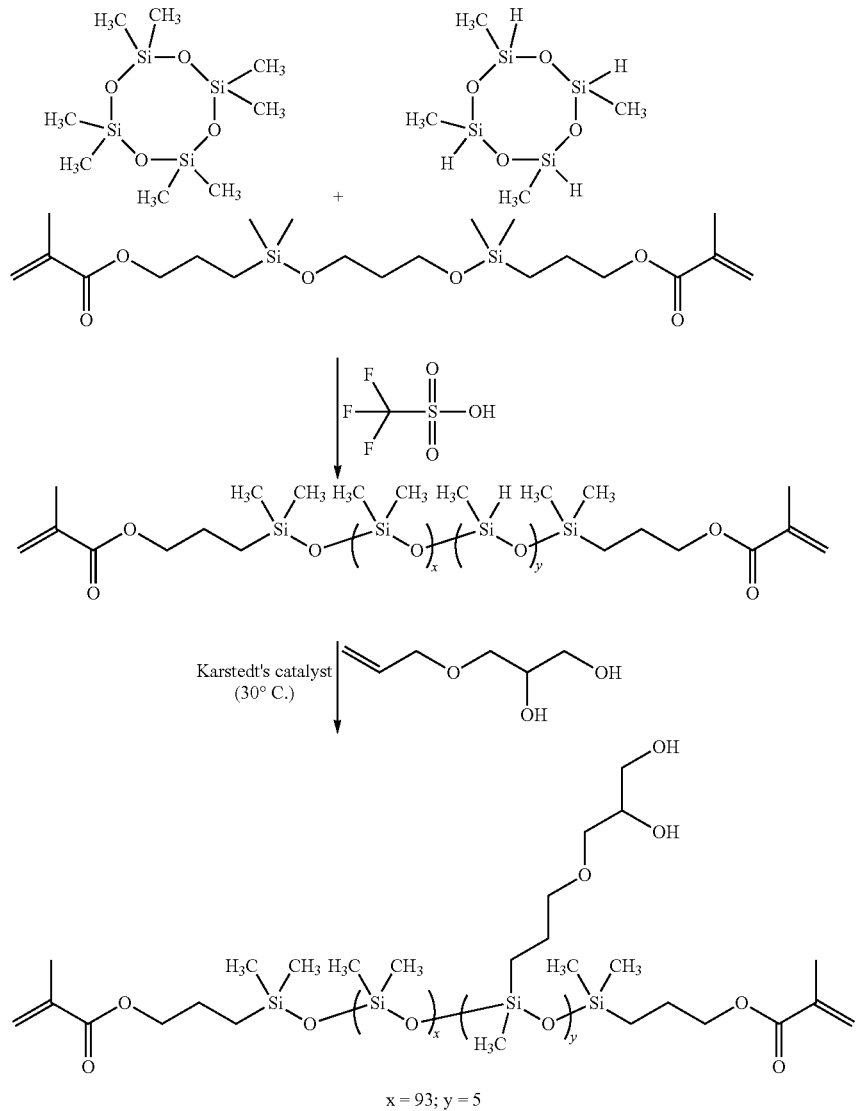

Scheme 1 x = 93; y = 5 and 5.03 g of 3-allyloxy-1,2-propanediol are added to the reactor. After the solution temperature is stabilized at 30° C., 152 μL of Karstedt's catalyst (2 Pt % in xylene) is added. After 2 h, the conversion of Si—H of 100% based on IR is achieved. The solution is then transferred to a flask, concentrated using Rotovop, followed by precipitation in actenotrile/water mixture (75/25) three times. After removal of solvent via Rotovop, followed by high vacuum, 12 g of hazy liquid is obtained.

Example 3

A preferred hydrophilized polydiorganosiloxane vinylic crosslinker is prepared by reacting succinic anhydride with a glycerol ether-containing PDMS macromer prepared in Example 2, according to scheme 2.

What is claimed is:

1. A hydrophilized polydiorganosiloxane vinylic crosslinker, comprising: (1) a polydiorganosiloxane polymer chain comprising dimethylsiloxane units and hydrophilized siloxane unit having one methyl substituent and one monovalent $C_{10}$-$C_{50}$ organic substituent having at least two carboxy groups, wherein the molar ratio of the hydrophilized siloxane units to the dimethylsiloxane units is from about 0.035 to about 0.25; (2) two terminal (meth)acryloyl groups, wherein the hydrophilized polydiorganosiloxane vinylic crosslinker has a number average molecular weight of at least about 3000 Daltons.

2. The hydrophilized polydiorganosiloxane vinylic crosslinker of claim 1, wherein the hydrophilized polydiorganosiloxane vinylic crosslinker is a polymer of formula (1)

Scheme 2

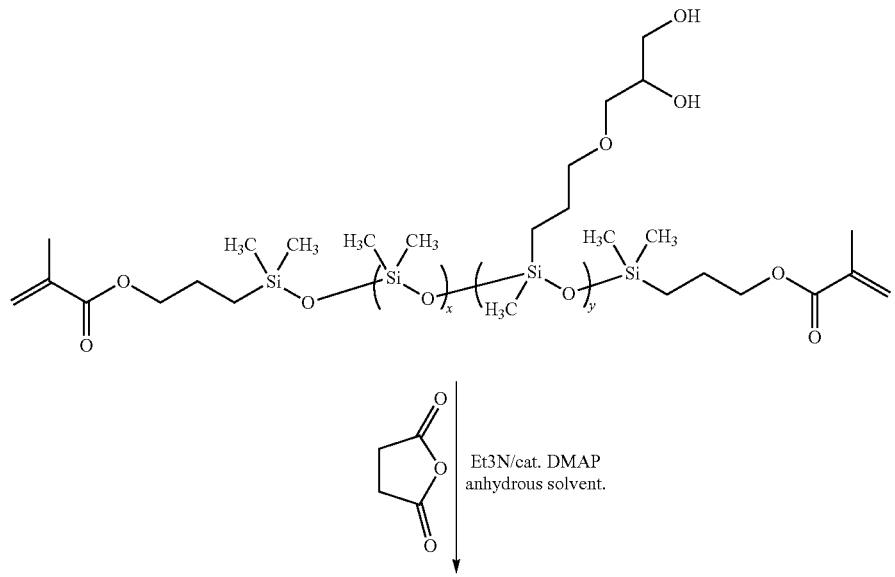

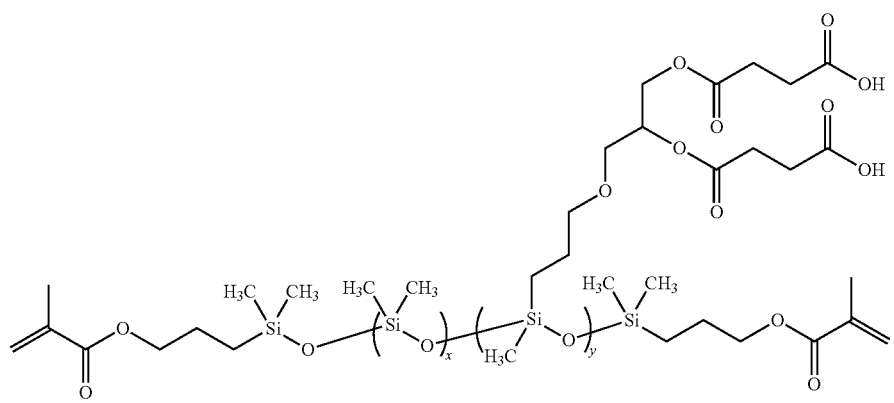

$$H_2C=\underset{R_1}{\overset{O}{\overset{\|}{C}}}-\overset{O}{\overset{\|}{C}}-X_0-R_2-\underset{CH_3}{\overset{CH_3}{\overset{|}{Si}}}-O-\left(\underset{CH_3}{\overset{CH_3}{\overset{|}{Si}}}-O\right)_{\upsilon 1}-\left(\underset{CH_3}{\overset{R_4}{\overset{|}{Si}}}-O\right)_{\omega 1}-\underset{CH_3}{\overset{CH_3}{\overset{|}{Si}}}-R_3-X_0-\overset{O}{\overset{\|}{C}}-\underset{R_1}{\overset{}{C}}=CH_2 \qquad (1)$$

in which:
   $\upsilon 1$ is an integer of from 30 to 500 and $\omega 1$ is an integer of from 1 to 75, provided that $\omega 1/\upsilon 1$ is from about 0.035 to about 0.25;
   $X_0$ is O or NR' in which R' is hydrogen or $C_1$-$C_{10}$-alkyl;
   $R_1$ is hydrogen or methyl;
   $R_2$ and $R_3$ independently of each other are a substituted or unsubstituted $C_1$-$C_{10}$ alkylene divalent radical or a divalent radical of $R_5$—O—$R_6$— in which $R_5$ and $R_6$ independently of each other are a substituted or unsubstituted $C_1$-$C_{10}$ alkylene divalent radical;
   $R_4$ is a monovalent radical of formula (2)

$$-(CH_2)_{\overline{n1}}(O-CH_2)_{\overline{q1}}\underset{R_8}{\overset{R_7}{\overset{|}{C}}}-CH_2-O-\overset{O}{\overset{\|}{C}}-C_2H_4-\overset{O}{\overset{\|}{C}}-OH \qquad (2)$$

q1 is zero or 1;
n1 is an integer of 2 to 4;
$R_7$ is hydrogen, methyl, or a radical of $$-CH_2-O-\overset{O}{\overset{\|}{C}}-C_2H_4-\overset{O}{\overset{\|}{C}}-OH;$$

$R_8$ is ethyl or a radical of $$-O-\overset{O}{\overset{\|}{C}}-C_2H_4-\overset{O}{\overset{\|}{C}}-OH \quad \text{or}$$
$$-CH_2-O-\overset{O}{\overset{\|}{C}}-C_2H_4-\overset{O}{\overset{\|}{C}}-OH;$$

provided that at least one of $R_7$ and $R_8$ is a radical of $$-O-\overset{O}{\overset{\|}{C}}-C_2H_4-\overset{O}{\overset{\|}{C}}-OH \quad \text{or}$$
$$-CH_2-O-\overset{O}{\overset{\|}{C}}-C_2H_4-\overset{O}{\overset{\|}{C}}-OH.$$

3. The hydrophilized polydiorganosiloxane vinylic crosslinker of claim 2, wherein $R_4$ is of formula (2) in which n1 is 3, q1 is 1, $R_7$ is hydrogen, $R_8$ is a radical of $$-O-\overset{O}{\overset{\|}{C}}-C_2H_4-\overset{O}{\overset{\|}{C}}-OH.$$

4. The hydrophilized polydiorganosiloxane vinylic crosslinker of claim 2, wherein $R_4$ is of formula (2) in which n1 is 3, q1 is 1, $R_7$ is a radical of $$-CH_2-O-\overset{O}{\overset{\|}{C}}-C_2H_4-\overset{O}{\overset{\|}{C}}-OH,$$

$R_8$ is ethyl.

5. The hydrophilized polydiorganosiloxane vinylic crosslinker of claim 2, wherein $R_4$ is of formula (2) in which n1 is 3, q1 is 1, $R_7$ and $R_8$ are a radical of $$-CH_2-O-\overset{O}{\overset{\|}{C}}-C_2H_4-\overset{O}{\overset{\|}{C}}-OH.$$

6. The hydrophilized polydiorganosiloxane vinylic crosslinker of claim 3, wherein in formula (1) $\omega 1/\upsilon 1$ is from about 0.040 to about 0.18.

7. The hydrophilized polydiorganosiloxane vinylic crosslinker of claim 3, wherein the hydrophilized polydiorganosiloxane vinylic crosslinker has a number average molecular weight of from about 4000 Daltons to about 80,000 Daltons.

8. The hydrophilized polydiorganosiloxane vinylic crosslinker of claim 3, wherein in formula (1) $X_0$ is O.

9. The hydrophilized polydiorganosiloxane vinylic crosslinker of claim 3, wherein in formula (1) $X_0$ is NR' in which R' is hydrogen or $C_1$-$C_{10}$-alkyl.

10. The hydrophilized polydiorganosiloxane vinylic crosslinker of claim 4, wherein in formula (1) $\omega 1/\upsilon 1$ is from about 0.040 to about 0.18.

11. The hydrophilized polydiorganosiloxane vinylic crosslinker of claim 4, wherein the hydrophilized polydiorganosiloxane vinylic crosslinker has a number average molecular weight of from about 4000 Daltons to about 80,000 Daltons.

12. The hydrophilized polydiorganosiloxane vinylic crosslinker of claim 4, wherein in formula (1) $X_0$ is O.

13. The hydrophilized polydiorganosiloxane vinylic crosslinker of claim 3, wherein in formula (1) $X_0$ is NR' in which R' is hydrogen or $C_1$-$C_{10}$-alkyl.

14. The hydrophilized polydiorganosiloxane vinylic crosslinker of claim 5, wherein in formula (1) $\omega 1/\upsilon 1$ is from about 0.040 to about 0.18.

15. The hydrophilized polydiorganosiloxane vinylic crosslinker of claim 5, wherein the hydrophilized polydiorganosiloxane vinylic crosslinker has a number average molecular weight of from about 4000 Daltons to about 80,000 Daltons.

16. The hydrophilized polydiorganosiloxane vinylic crosslinker of claim 5, wherein in formula (1) $X_0$ is O.

17. The hydrophilized polydiorganosiloxane vinylic crosslinker of claim 5, wherein in formula (1) $X_0$ is NR' in which R' is hydrogen or $C_1$-$C_{10}$-alkyl.

* * * * *